US 11,247,648 B2

(12) United States Patent
Kirkpatrick et al.

(10) Patent No.: US 11,247,648 B2
(45) Date of Patent: Feb. 15, 2022

(54) TIRE MONITORING DEVICE AND SYSTEM FOR USE WITH A VEHICLE ON BOARD STABILITY CONTROL SYSTEM

(71) Applicant: Schrader Electronics Limited, Antrim (GB)

(72) Inventors: Darren Kirkpatrick, Antrim (GB); Jonathan Barr, Belfast (GB); Stephen Keyes, Belfast (GB)

(73) Assignee: Schrader Electronics Limited, Antrim (GB)

( * ) Notice: Subject to any disclaimer, the term of this patent is extended or adjusted under 35 U.S.C. 154(b) by 416 days.

(21) Appl. No.: 15/388,751

(22) Filed: Dec. 22, 2016

(65) Prior Publication Data
US 2017/0174193 A1 Jun. 22, 2017

(30) Foreign Application Priority Data

Dec. 22, 2015 (GB) ..................................... 1522582

(51) Int. Cl.
*B60T 8/172* (2006.01)
*B60C 23/04* (2006.01)

(52) U.S. Cl.
CPC ........ *B60T 8/1725* (2013.01); *B60C 23/0408* (2013.01); *B60C 23/0474* (2013.01); *B60C 23/0488* (2013.01); *B60T 2240/03* (2013.01)

(58) Field of Classification Search
None
See application file for complete search history.

(56) References Cited

U.S. PATENT DOCUMENTS

| 5,231,872 A * | 8/1993 | Bowler | B60C 23/007 340/445 |
| 5,731,516 A * | 3/1998 | Handfield | B60C 23/0401 73/146.5 |
| 6,259,360 B1 | 7/2001 | Takamura | |
| 6,943,674 B2 * | 9/2005 | Tsai | B60C 23/043 340/426.33 |

(Continued)

FOREIGN PATENT DOCUMENTS

| EP | 2780180 B1 | 5/2017 |
| JP | 2005319835 A | 11/2005 |

(Continued)

OTHER PUBLICATIONS

Search Report from the GB Intellectual Property Office for Application No. GB1522582.4, dated Jun. 29, 2016.

(Continued)

*Primary Examiner* — Nicholas K Wiltey
(74) *Attorney, Agent, or Firm* — Mark H. Whittenberger; Holland & Knight LLP

(57) ABSTRACT

A tire monitoring device comprising a sensor for monitoring a tire parameter and a first controller for controlling the operation of the device. A measurement apparatus is provided for generating parameter measurement data from the sensor output signal. A second controller is provided for controlling the operation of the measurement apparatus. The second controller communicates parameter data to the first controller based on the measurement data. The device is particularly suited to monitoring tire pressure and detecting tire burst events.

15 Claims, 4 Drawing Sheets

(56) References Cited

U.S. PATENT DOCUMENTS

| | | | |
|---|---|---|---|
| 9,733,559 B2* | 8/2017 | Tsuji | G02B 26/0833 |
| 10,166,822 B2* | 1/2019 | Kosugi | B60C 23/0416 |
| 2005/0085987 A1* | 4/2005 | Yokota | B60C 23/0477 |
| | | | 701/80 |
| 2005/0229691 A1 | 10/2005 | Shaw et al. | |
| 2006/0111829 A1* | 5/2006 | Williams | B60C 23/04 |
| | | | 701/79 |
| 2007/0267212 A1* | 11/2007 | Nachbauer | B60R 16/0207 |
| | | | 174/70 R |
| 2007/0279201 A1 | 12/2007 | Casey et al. | |
| 2008/0061625 A1* | 3/2008 | Schmitt | B60C 23/0408 |
| | | | 303/146 |
| 2014/0180527 A1* | 6/2014 | Kosugi | B60C 23/0416 |
| | | | 701/29.4 |
| 2015/0002318 A1 | 1/2015 | Cahill | |
| 2016/0016445 A1* | 1/2016 | Peine | B60C 23/0486 |
| | | | 73/146.5 |
| 2018/0208003 A1* | 7/2018 | Fink | B60C 23/061 |

FOREIGN PATENT DOCUMENTS

| | | | |
|---|---|---|---|
| JP | 2010241222 A | 10/2010 | |
| JP | 2014240222 A | 12/2014 | |

OTHER PUBLICATIONS

Office Action issued in Japanese Patent Application No. 2016-228004, dated May 25, 2021.

* cited by examiner

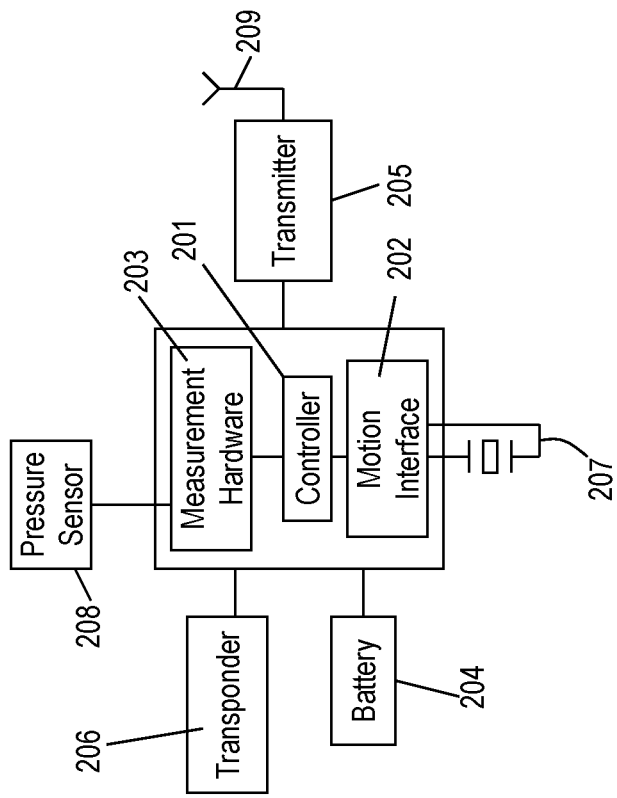
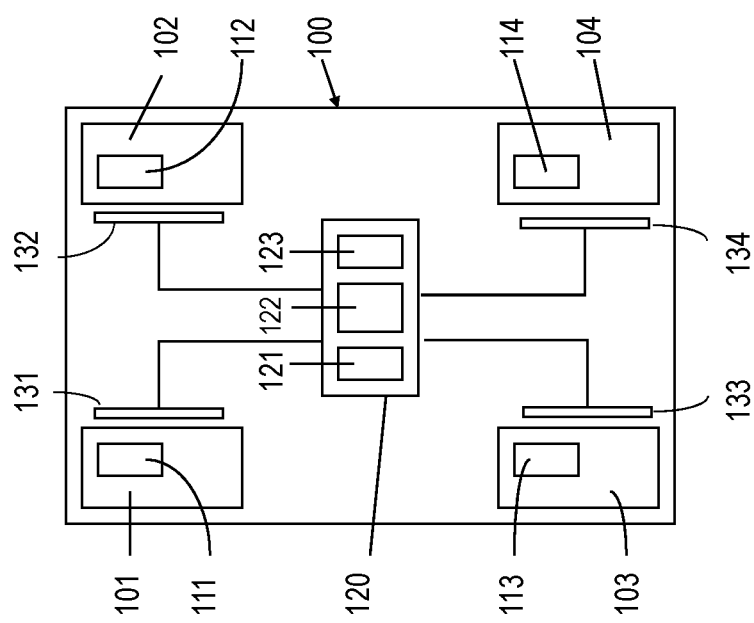
Fig. 2
Fig. 1

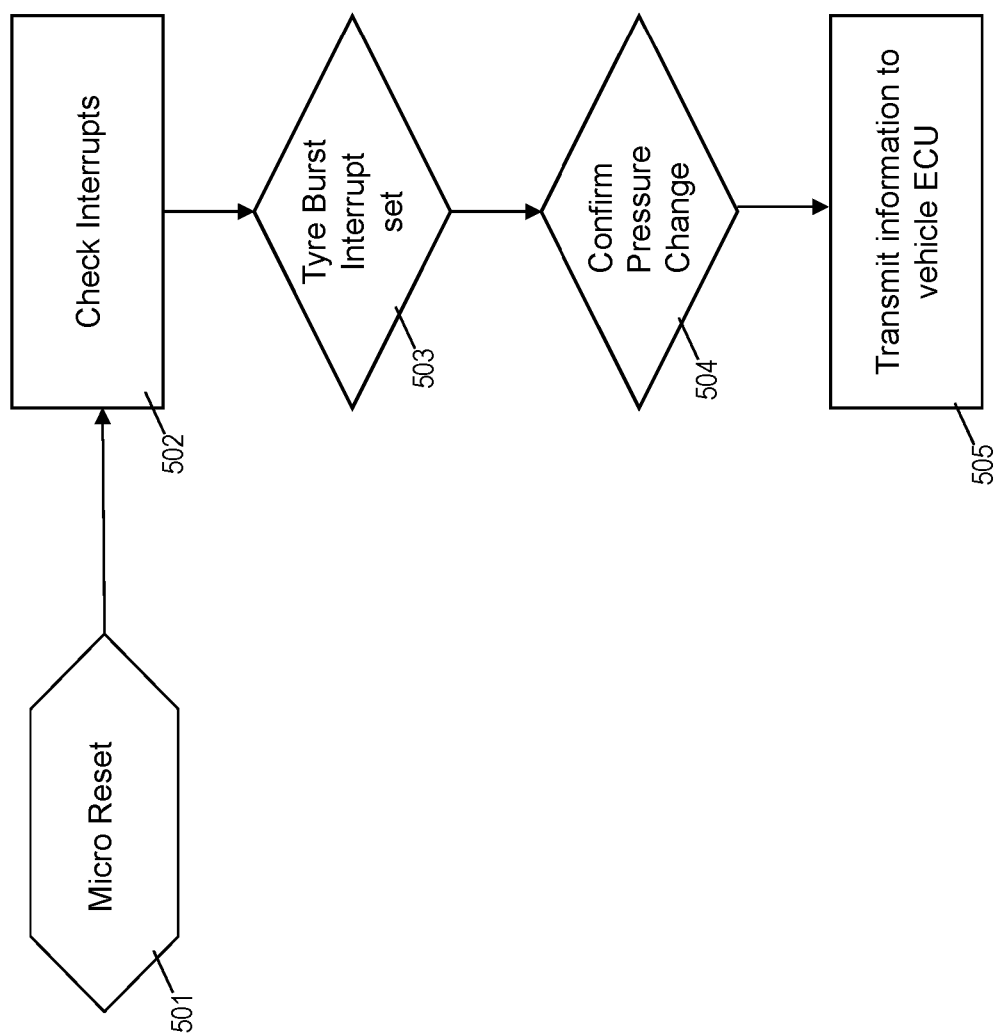

TIRE MONITORING DEVICE AND SYSTEM FOR USE WITH A VEHICLE ON BOARD STABILITY CONTROL SYSTEM

FIELD OF THE INVENTION

The present invention relates tire monitoring devices, and especially to the integration of a tire pressure monitoring system with a stability control system of a vehicle. In particular the invention is directed toward a system and method for notifying the stability control system of a tire burst event.

BACKGROUND TO THE INVENTION

Electronic safety measures are becoming more common on vehicles. One commonly used electronic safety device is the Tire Pressure Monitoring System (TPMS) designed to warn a driver if the pressure level in one or more of the vehicle tires is below a safe level. Increasingly TPMS devices are able to monitor other characteristics of the tire such as yaw, temperature and load. This is a move toward a tire mounted sensor able to monitor a wide range a tire characteristics not just pressure, making an "intelligent" tire. Other safety systems include Anti-lock Braking Systems (ABS) designed to prevent any wheels from skidding and Electronic Stability Controls (ESC) designed to prevent unsafe vehicle handling characteristics. ESC systems already rely heavily upon data captured from the ABS and are typically closely integrated with the ABS system in order to correct or mitigate dangerous handling characteristics. Tire parameters are another set of factors that can adversely affect vehicle handling. However TPMS has not traditionally been integrated with the ESC system.

The principle purpose behind the TPMS system is to indicate to the driver that the pressure in one or more of the tires is below optimum levels well before the pressure is low enough to cause a loss of control of the vehicle or damage to the sidewalls of the tire. Typically tire pressure monitoring systems are not able to provide an immediate warning of a rapid pressure drop, where a severe loss in pressure can cause a sudden loss of control of the vehicle which can cause traffic accidents, known as a tire burst event. In addition TPMS devices may also be capable of monitoring other tire characteristics.

The electronic stability Control (ESC) system, also known as an electronic stability program, is intended to try to counteract and mitigate any uncontrollable or dangerous motion by the vehicle in order to reduce the severity and occurrence of accidents. One such major cause of a loss of control of a vehicle is a tire burst event.

The ESC system allows for the vehicle to make automated adjustments to the drive condition of the vehicle if it detects that the vehicle is handling outside of safe thresholds. The level of intervention from the ESC can change depending upon the severity of the detected problem, for example it can range from lightly applying braking or minor steering correction, to more significant intervention in preventing a rollover.

In the event of a tire burst there could be a sudden shift in the weight distribution of the vehicle as any weight previously supported by a blown tire is shifted to the other tires of the vehicle, resulting in not only in potentially over/understeer and increased braking distance but even a catastrophic loss of control of the vehicle. It is therefore important to recognise and counteract a tire burst event as quickly as possible.

The severity of the tire burst will depend upon the speed of the vehicle, how many wheels the vehicle has, the weight of the vehicle, where the wheels are disturbed and the location of the tire which experiences the blow out. On a slow moving vehicle with multiple sets of dual wheels a single tire burst may have little impact on the handling characteristics of the vehicle. However a fast moving vehicle, with a high centre of gravity, which experiences a blowout on one of its steering wheels is at high risk of a rollover.

In arriving at the present invention it is recognised that ESC systems could be further improved and given added capabilities by increased integration of tire parameter data captured by a tire mounted sensing device. However, if the traditional TPMS design were to be employed for rapidly monitoring pressure for potential burst events some problematic limitations would need to be overcome. Typically a tire pressure monitoring system is expected to last for 10 years on a battery that cannot be easily replaced. Many TPMS designs use an epoxy resin or laser welded housing in order to protect the electronics from dirt and moisture, this however makes it impossible to replace the battery without severely damaging this protective coating. Therefore power management is a major concern when designing a TPMS device. A further issue with the commonly used TPMS device designs is the use of a single microprocessor or controller to manage and process all key functions of the device. This means that if the controller is currently being used to perform a process intensive task such as auto location, it may not be able to simultaneously monitor pressure, which in turn compromises its ability to rapidly detect a tire burst event.

SUMMARY OF THE INVENTION

A first aspect of the invention provides a tire monitoring device comprising: a sensor for monitoring a respective tire parameter to produce a sensor output signal; a first controller for controlling the operation of the device; a measurement apparatus for generating parameter measurement data from said sensor output signal, and a second controller for controlling the operation of said measurement apparatus to generate said measurement data, the second controller being configured to communicate parameter data to said first controller based on said measurement data.

Typically said measurement data comprises an indication of whether said respective parameter has changed by more than a threshold amount. Said measurement data may comprise a measured value for said respective parameter.

In preferred embodiments said second controller is configured to detect an event from said measurement data, said parameter data being indicative of said event.

Preferably said second controller is configured to communicate said parameter data to said first controller by generating an interrupt signal for first controller. Said first controller may be responsive to said interrupt signal to implement an interrupt handling routine for said event. Preferably said first controller is configured to reset upon receipt of said interrupt signal. Said first controller may have an interrupt control register and wherein said second controller communicates said parameter data to said first controller by setting one or more bits of said interrupt control register.

Typical embodiments include a transmitter for communicating with a central control unit, said first controller being configured to send a tire parameter transmission to said central controller based on said parameter data received from said second controller.

In preferred embodiments said sensor is a pressure sensor and said respective tire parameter is tire pressure. Said second controller may be configured to detect tire burst events from said measurement data and to communicate a detected tire burst event to said second controller.

Said measurement apparatus may comprise a comparator, preferably a window comparator, said comparator being responsive to changes in the sensor output signal to generate measurement data indicating if said respective parameter has changed by more than a threshold amount.

Typically said measurement data comprises an indication of whether said respective parameter has changed by more than a threshold amount with respect to a reference value.

From a second aspect the invention provides a tire monitoring system for a wheeled vehicle, said tire monitoring system comprising a respective wheel mountable tire monitoring device for a respective wheel of the vehicle, and a vehicle mountable central controller, said respective tire monitoring device and said respective central controller comprising wireless communication means to allow said respective tire monitoring device to communicate with said central controller, wherein said respective tire monitoring device comprises a tire monitoring device according to the first aspect of the invention.

A third aspect of the invention provides a tire monitoring system for a wheeled vehicle, said tire monitoring system comprising a respective wheel mountable tire monitoring device for a respective wheel of the vehicle, and a vehicle mountable central controller, said respective tire monitoring device and said respective central controller unit comprising wireless communication means to allow said respective tire monitoring device to communicate with said central controller, wherein said respective tire monitoring device comprises:

a vibration-sensitive sensor for monitoring a respective tire parameter to produce a sensor output signal that includes a vibration component indicative of vibration experienced in use by said respective wheel;

measurement apparatus for generating measurement data from said sensor output signal, said measurement data comprising vibration data corresponding to said vibration component; and a controller configured to send a tire parameter transmission to said central controller, said transmission comprising said vibration data and/or vibration-related data derived therefrom, and wherein said central controller includes, or is co-operable with, an Anti-lock Braking System (ABS), and is responsive to receipt of said transmission to adjust or disable said Anti-lock Braking System depending on said vibration data and/or said vibration-related data.

Typically said central controller is configured to disable said Anti-lock Braking System upon determining from said vibration data and/or said vibration-related data that vibration experienced in use by said respective wheel exceeds a threshold level. Said sensor may comprise a motion sensor.

A microprocessor can become a major power drain if in constant use, so it is advantageous not to use the microprocessor during rapid pressure monitoring for power saving reasons.

In preferred embodiments, a dedicated means, or more particularly a dedicated pressure monitor, is provided, typically as part of a TPMS device, that is separate from the main processor of the device and is able to monitor pressure using low power hardware so that pressure can be continuously monitored without a significant increase in power usage or inhibiting the microprocessor from performing process intensive tasks.

An advantage of preferred embodiments of the present invention is a reduction in the time taken to detect a tire burst event and transmit information about the tire burst event to the ECU. A further advantage is that a rapid pressure sampling rate can be maintained in all modes independent of the activity of the microprocessor. Advantageously, the microprocessor is not needed for pressure sampling and so a reduction in power consumption and therefore an extension of battery life can be achieved without any loss of performance or functionality.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which:

FIG. 1 is a block diagram of a vehicle including a tire pressure monitoring system;

FIG. 2 is a block diagram of a tire pressure monitoring device embodying one aspect of the invention, the device being a wheel mountable component of the tire pressure monitoring system of FIG. 1;

FIG. 5 is a flow chart illustrating an exemplary operation of the tire monitoring device of FIG. 2 in the event of a tire burst event being detected.

DETAILED DESCRIPTION OF THE DRAWINGS

Figure 3:
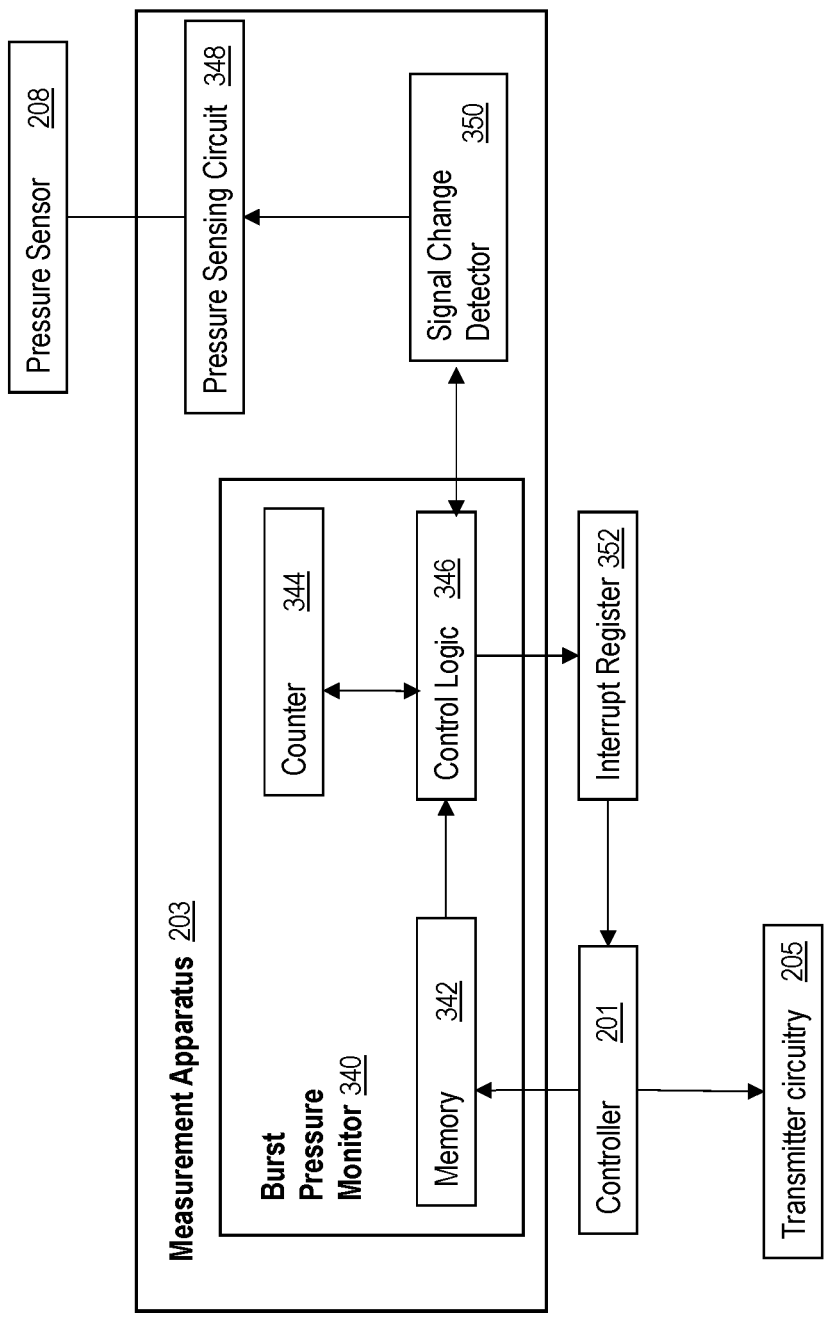
FIG. 3 is an alternative block diagram of the tire monitoring device of FIG. 2 illustrating in particular a tire burst monitor and related measurement and transmission components.

FIG. 1 shows a system diagram of a wheeled vehicle 100, each wheel including a tire mounted on a rim. The arrangement and number of wheels can vary depending on the vehicle. In this example 4 wheels are shown 101, 102, 103 and 104. Each wheel is fitted with a tire pressure monitoring device, also known as a TPMS sensor or TPMS device, 111, 112, 113 and 114, being a wheel mountable component of a tire pressure monitoring system (TPMS). The TPMS device can be mounted to either the tire or rim of the respective wheel. The vehicle includes a control unit, for example electronic control unit (ECU) 120, which is configured to receive and process transmissions from the TPMS devices 111, 112, 113, 114 and as such forms part of the TPMS. The ECU 120 typically comprises at least a TPMS receiver 121, a controller 122, and a means of communicating with other vehicle electronics 123, such as a CAN or LIN bus. The TPMS receiver 121 receives signals, typically wirelessly, from the TPMS devices 111, 112, 113, 114 and the controller 122 is configured to process the signals to perform tire pressure monitoring, the nature of which may vary from system to system. The TPMS receiver 121 and TPMS devices 111, 112, 113, 114 each may include any suitable conventional wireless communication device for supporting wireless communication between the TPMS receiver 121 and TPMS devices 111, 112, 113, 114. The ECU may be integrated, or be otherwise co-operable, with an ABS system 131, 132, 133 and 134 of the vehicle which includes a speed sensor for each axle, to determine the speed of their respective rotations and means for applying braking if necessary to avoid accidents. The ABS system may further be integrated into, or be otherwise co-operable with, an ESC system (not illustrated). The ESC system and/or the ABS system may be incorporated into the ECU or provided separately as is convenient, and may control the operation of various components of the vehicle, primarily for reasons of safety, as is well known.

FIG. 2 shows a block diagram of an embodiment of the TPMS device 111, 112, 113, 114. The TPMS device includes a central controller 201, which may comprise a suitably programmed processor, for example a dedicated microprocessor or a microcontroller, or other programmable processing device. Standard components such as a RAM memory, an ADC, an I/O interface, a clock oscillator and a central microprocessor (not shown) may be provided, the components typically being integrated onto a single chip. Alternatively, a custom microcontroller, for example an Application Specific Integrated Circuit (ASIC), designed from the ground up for the TPMS application may be used and may integrate ancillary components such as a temperature sensor.

The TPMS device is typically powered by a battery 204 although other micro power sources may be used, e.g. thermoelectric and/or piezoelectric generators and/or electromagnetic induction device, instead of or in addition to the battery. A transponder 206 may be provided to receive command signals (e.g. for programming the TPMS device), preferably at 125 kHz. A motion detector 207, for example comprising one or more shock sensors, accelerometer or roll switch, is typically provided and may interface with the controller 201 using any suitable conventional interface hardware 202.

A pressure sensor 208, e.g. a piezoresistive transducer or a piezoelectric or capacitance based pressure sensor, is provided for measuring the fluid (typically air or other gas) pressure in the respective tire. The pressure sensor 208 is connected to a measurement apparatus 203 for measuring the pressure using signals received from the pressure sensor 208 and for providing corresponding measurement information to the controller 201. During routine pressure measurement, under control of the controller 201 the measurement apparatus 203 samples the output of the pressure sensor 208 at intervals and communicates corresponding measurement data to the controller 201. Typically, the measurement apparatus 203 comprises hardware, i.e. electronic circuitry, for performing its measurement tasks, the configuration of which may vary but typically includes at least one amplifier, may include at least one filter and, for the purposes of routine pressure measurement at least, may include an analogue to digital converter (ADC) (not shown) for measuring pressure values. The measurement apparatus 203 may therefore be described as means for controlling the measuring of pressure.

A transmitter 205 with antenna 209 are used to makes transmissions to the vehicle ECU 120 preferably at 315 or 433 MHz.

In typical embodiments, the TPMS device 111, 112, 113, 114 may be similar to known TPMS devices and may share many features with those devices already well known to those skilled in the art. The fundamentals of the TPMS system may remain the same—a self-powered TPMS device attached in use to a vehicle wheel, in a manner that allows it to measure the pressure and optionally the temperature of the gas in the tire. Pressure measurements are usually taken periodically. In use the TPMS device transmits data representing the measured parameters to an external controller such as the vehicle ECU 120. A temperature sensor may also be provided. An oxygen sensor can be fitted to determine, if gas in the tire is air or atmospheric nitrogen.

The TPMS device 111, 112, 113, 114 may in addition to being able to measure and transmit pressure data, be capable of making sophisticated and lengthy calculations. For example auto location methods based on the precise speed of the wheel, may require process intensive calculations to compensate for any phase delay or noise in the motion detection hardware. This increasing need to perform time consuming computational tasks, renders the central controller 201 alone unsuitable for dealing with tire burst events.

It is desirable that the ECU, or more particularly the ESP system, knows that a tire has burst quickly, typically within 500 ms. In this time the TPMS device would need to identify that a tire burst has occurred and send the information to the ECU/ESP system. This presents several challenges for the TPMS device as a fast pressure sample rate is required (increasing the current requirement) and the sensor must react to a tire burst event even if other functions/processes are in progress. As tire burst detection is desirable in all driving modes it would be advantageous if pressure samples could be taken, preferably at regular intervals, without intervention from the controller 201 and that the TPMS device could react quickly to a tire burst or rapid deflation regardless of its current state.

FIG. 3 is a block diagram a preferred measurement apparatus 203 that detects tire bust events and embodies one aspect of the present invention. The measurement apparatus 203 may include conventional components, such as amplifier(s), filter(s) and/or an ADC, for allowing the TPMS device 111, 112, 113, 114 to perform routine pressure measurements, but these are not shown for reasons of clarity. It is noted however, that, in some embodiments, some of the illustrated components (e.g. the pressure sensing circuit) may be used for routine pressure measurement as well as for detecting tire burst events. It will be understood that the measurement performed by the measuring apparatus may involve a full, or absolute, measurement of the tire pressure and/or a relative measurement, in particular a determination as to whether or not the pressure value has changed by more than a threshold amount. Accordingly the output of the measurement apparatus 203 may be said to comprise measurement data that may comprise a full, or absolute, measurement of the tire pressure and/or an indication of whether or not the pressure value has changed by more than a threshold amount.

The measurement apparatus 203 comprises a tire burst pressure monitor (BPM) 340 and means for detecting if the output of the pressure sensor 208 (i.e. the output corresponding to the sensed pressure in the tire) has changed by more than a threshold amount. The value of the threshold amount may vary but is indicative of a tire burst event. The variation in the pressure value is preferably measured with respect to a reference value but may alternatively be assessed absolutely.

The preferred BPM 340 comprises a memory 342, a counter 344 and BPM controller, shown in FIG. 3 as control logic 346. The memory 342 may take any convenient conventional form, e.g. RAM, and in preferred embodiments stores a reference pressure value and a value for the pressure change threshold that is deemed to indicate a tire burst event.

In preferred embodiments, the reference value represents the tire pressure at either its cold placard reference or at least within the acceptable range of pressure as required by safety standards. The reference pressure value can be pre-programmed or it can be recorded by the TPMS device after the TPMS device has performed a complete pressure measure. Advantageously, the reference value can be updated or compensated as required. For example, setting and/or adjusting the reference value may be a task performed by the controller 201 during an initialization process and/or at other times when the controller 201 is not otherwise occupied.

In preferred embodiments, threshold value represents an acceptable deviation from the reference pressure value whereby any pressure readings than that are different to the reference value by more than the threshold amount are treated as an indication of a tire burst event. The pressure change threshold can be a pre-set value or a percentage of the reference pressure value. It may be fixed or adjustable, for example depending on one or more factors such as measured pressure, temperature, road surface condition or speed. Setting and/or adjusting the threshold value may be performed by the controller 201 during an initialization process and/or at other times when the controller 201 is not otherwise occupied.

The counter 344 may take any convenient conventional form and may be used by the control logic 346 to set the periodic basis for checking for tire burst events. For example, it can run from its own dedicated oscillator or it can be derived from the main system oscillator of the TPMS device.

The BPM controller 346 is preferably implemented in hardware, i.e. logic circuitry, but may alternatively be implemented in any other convenient conventional manner, e.g. by a suitably programmed microprocessor or microcontroller. The BPM controller 346 controls the operation of the BPM 340, which includes periodically checking pressure measurements and determining if the pressure has deviated by more than the threshold amount, with respect to the reference value in preferred embodiments.

In the illustrated embodiment, the means for detecting if the output of the pressure sensor 208 has changed by more than a threshold amount is provided by a pressure sensing circuit 348 and a signal change detector 350. The pressure sensing circuit 348 comprises electronic circuitry for sampling the output of the pressure sensor 208 and produces a signal that corresponds to the pressure detected by the sensor 208 at the time of sampling. The circuit 348 may have any suitable conventional configuration for this purpose, typically including one or more amplifiers and optionally one or more filters. The signal change detector 350 comprises electronic circuitry for indicating if the sampled pressure changes by more than the threshold amount. The circuit 350 may have any suitable conventional configuration for this purpose but in preferred embodiments includes a comparator for comparing the output of the pressure sensing circuit 348 to the reference value and produces an output indicating if the sampled pressure value deviates from the reference value by more than the threshold amount. The reference value is preferably programmable and may be updated during use, for example based on one or more previously sampled pressure values.

In preferred embodiments, the signal change detector 350 comprises a window comparator (not shown), and the pressure sensing and change detecting circuits 348, 350 may be implemented by a window comparator circuit such as that described in European Patent application EP2780180. Using a window comparator allows for a pressure signal to be measured and compared against a threshold window, using relatively little time and current. The window comparator allows for the pressure to be checked frequently using relatively little power. It will be apparent that the window comparator circuit of EP278180 could be used to implement both circuits 348, 350.

Alternatively any circuit able to detect a change in the signal level from the pressure sensor 208 could be used. Typically, the pressure sensor produces an analogue DC output. Those skilled in the art will be aware of alternative circuits able to detect a change in the level of an analogue DC signal, e.g. comprising an ADC. Ideally, the purpose of the circuit 350 is to provide means for detecting a threshold change in the pressure measurements with a sufficient degree of accuracy, whilst keeping power usage to a minimum. It is therefore possible that a low power ADC could be used for this purpose.

The BPM 340 is in communication with the signal change detector 350 and determines from its output whether or not the sampled pressure has changed by more than the relevant threshold amount. Upon determining that the tire pressure has changed by more than the threshold amount, i.e. that a tire burst event has been detected, the BPM 340 communicates the event to the controller 201. More generally this may be said to involve communicating parameter related data to the controller 201. In preferred embodiments, the BPM 340 achieves this by generating an interrupt signal to the controller 201. Typically, the controller 201 has an interrupt register 352 by which it may receive the interrupt signal. To this end, the BPM 340 is in communication with the interrupt register 352 and sets an interrupt when a tire burst event is detected. Advantageously, the BPM 340 is able to a set an interrupt that causes the controller 201 to restart. The controller 201 is configured to prioritize the tire burst interrupt upon restarting and carries out any tasks associated with a tire burst interrupt. To this end the controller 201 is typically of a type that comprises a microprocessor, or other processor, that supports interrupts and that that be configured to restart upon receipt of an interrupt and to handle the interrupt upon restarting. Alternatively, the controller 201 may be of a type that is configurable to handle the interrupt immediately upon receipt without necessarily restarting.

The interrupt register 352 can be implemented as a series of OR gates. Each interrupt can be represented by a single bit of the register whereby if the bit is a 0 the interrupt is not set and if the bit is a 1 the interrupt has been set (or vice versa). The interrupt register 352 can be coupled to a clock gating means (no shown) for the controller 201 allowing the interrupt register to suspend the clock signal to the controller 201. This will cause the controller 201 to reset. Upon reset the controller 201 checks the interrupt register 352 and, if the tire burst interrupt is set, it will prioritize the tire burst interrupt and carry out the necessary functions.

In use of the preferred embodiment, the BPM 340 periodically samples the tire pressure and triggers a reset of the controller 201 upon detection of a tire burst event. Once reset the controller 201 checks the interrupt register and handles the tire burst interrupt, preferably as its first priority. Typically this involves sending a tire burst transmission to the ECU 120 via transmitter 205, preferably immediately. The tire burst transmission may for example comprise either a low pressure warning code or the low pressure value itself. Upon receipt of the tire burst transmission, the ECU 120 is configured to determine whether or not the value is low enough for action to be taken, for example by the ESC system. In the case where the tire burst transmission comprises a full pressure reading, the ECU 120 may be configured to compare the pressure reading to a threshold value to determine if it is low enough to take further action. In order to take a full pressure reading, the TPMS device 111, 112, 113, 114 may use the measurement circuitry normally provided in the measurement apparatus 203 for taking routine pressure measurements, which may or may not be included in the pressure sensing circuit 348 depending on the embodiment.

It will be apparent that the BPM controller 346 operates independently of the controller 201. This means that pressure can be monitored for tire burst events regardless of whether the controller 201 is busy with other tasks. Other than for initialising the BPM 340, the controller 201 is not required to monitor for tire burst events, leaving it free to perform other tasks.

In some embodiments, the BPM 340 may be configured to perform routine tire pressure measurements and report these to the controller 201. Alternatively the controller 201 may be configured to perform the routine pressure measurements and may do so in any convenient manner, e.g. using the measurement circuitry 348, 350, optionally via the BPM controller 342 or directly, and/or using other measurement circuitry (not shown).

The hardware used to implement the BPM 240 and associated circuitry 348, 350 may be provided in any convenient manner, e.g. integrated into a custom ASIC or provided as a separate discrete integrated circuit in conjunction with a more generic microcontroller design.

Figure 4:
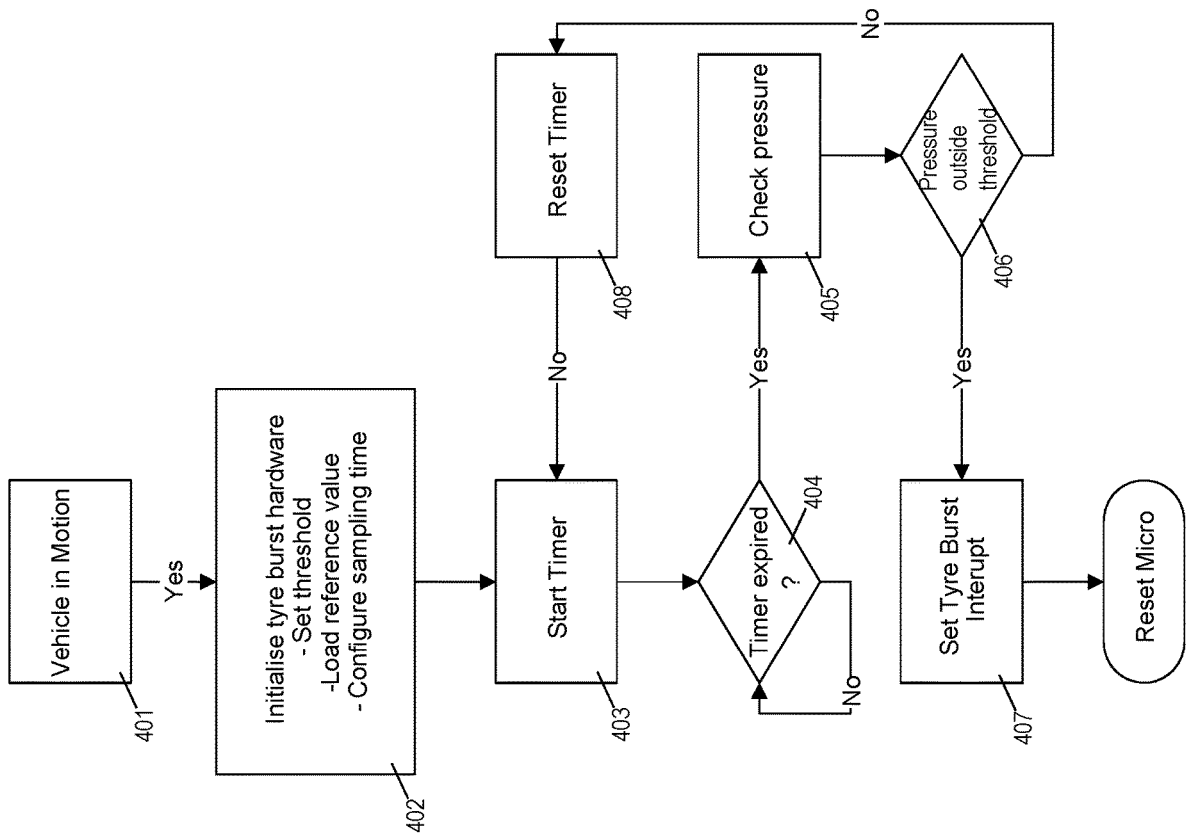
FIG. 4 is a flow chart illustrating an exemplary operation of the tire burst monitor included in FIG. 3.

FIG. 4 shows one example of the operation of the TPMS 111, 112, 113, 114 in relation to tire burst monitoring. Upon detection of motion via the motion detector 207 (step 401), the controller 201 initialises the BPM 340 (step 402). This involves setting the pressure reference value, the pressure change threshold value and a sampling time. Setting the sampling time may involve setting the counter 344 to count from (or up to) a given count value corresponding to the desired sampling period. Once the counter is started (step 403), the BPM controller 342 waits (step 404) until the counter 344 indicates that it is time to check the pressure upon which the BPM controller 342 checks the output of the change detector 350 to determine if a tire burst event is detected (steps 405 and 406). Steps 405 and 406 typically involve activating the pressure sensing circuit 348 and change detector 350 to sample the output of the pressure sensor 208 and determine if it lies within the limits determined by the pressure change threshold. If at step 406 the BPM controller 342 determines that a tire burst event is detected, then it generates a tire burst interrupt (step 407) causing the controller 201 to be reset, otherwise the counter is reset (step 408) and steps 403 to 408 are repeated.

FIG. 5 shows one example of the operation of the controller 201 upon being reset by the tire burst interrupt. Upon reset (step 501) the controller 201 determines the cause of the reset by checking the interrupt register 352 (step 502). If it determines that the reset was caused by a tire burst interrupt (step 503), it initiates a tire burst handling routine otherwise it may perform any other required initialisation or non-tire burst related interrupt handling routines that may be required (not illustrated). In the illustrated embodiment the tire burst handling routine involves taking a full pressure reading, e.g. using an Analog to Digital Converter (ADC), and confirms whether or not the pressure has fallen to an unacceptable level (e.g. by comparing the full measured value to the reference value) (step 504). If the tire burst event is confirmed, the controller 201 sends a tire burst transmission, optionally including the tire pressure data, to the vehicle ECU 120 (step 505) This transmission can occur multiple times with a re-measure in between each transmission. A full pressure reading using an ADC improves the accuracy of the system and reduces the likelihood of a false report of a tire burst. If at step 404 the tire burst event is not confirmed, then the tire burst handling routine terminates. It is not necessary to take the full pressure reading or to confirm the tire burst event. In alternative embodiments therefore, steps 504 and 505 may be replaced with alternative steps involving, for example, taking the full pressure measurement and sending the measurement to the ECU in the tire burst transmission without confirming the tire burst event, or sending a tire burst transmission that indicates that the event has occurred without sending the tire pressure measurement. The latter option may be performed with or without confirming the tire burst event.

Tire monitors embodying the invention are not limited for use in detecting tire burst events. Aside from pressure, other tire parameters that may be indicative of unsafe handling characteristics if outside a threshold could be monitored in similar way, such as temperature, tread depth, vibration, load or rotation speed. It is possible that such parameters are monitored by a device that does not also monitor tire pressure. Therefore the invention may be embodied in a device, especially a wheel mountable device, that is not a TPMS device. Furthermore, from another aspect the invention concerns integrating information obtained from a tire monitoring device with a vehicle's safety system(s), e.g. ABS or ESC systems, in order to enhance the performance of the safety system. It may be advantageous to use the tire monitoring device 111, 112, 113, 114 for such purposes, e.g. in relation to tire burst events or other events where fast detection is critical, but in other embodiments conventional tire monitoring devices may be used.

For example, the motion sensor 207 of the TPM device will experience some vibrations due to the condition of the road surface. These vibrations are manifested as signal noise in the sinusoidal output of the motion sensor. It is possible to monitor the noise of the motion sensor signal using a dedicated Signal-Noise Ratio circuit (not illustrated). The noise level can give an indication of the road surface condition and this information can be represented as a bit or series of bits in the transmitted data from the TPMS device to the vehicle ECU 120. The ECU 120 is then able to adjust the ABS and/or ESC systems accordingly. As ABS systems typically do not work well on rough road surface, if the data from the TPMS device indicates a rough road surface the ABS may be disabled or adjusted. Furthermore, load information, representing the weight distribution on each tire can indicate an imbalance in the vehicle's centre of gravity which could make steering or braking unsafe. As with other tire/wheel parameters load could be periodically monitored by dedicated sampling hardware, to allow for rapid monitoring. Alternatively monitoring could be left to the main controller of the wheel mounted device, but the rate of monitoring would not be as often.

For any such non-pressure related tire/wheel parameters, the respected dedicated monitoring circuitry may be provided in addition to the main controller (e.g. controller 201) and monitor the respective parameter independently of the controller, but may cooperate with the main controller in order to send relevant parameter related information to the ECU 120. In general therefore the parameter monitoring device comprises a measurement apparatus for generating parameter measurement data from the sensor output signal, and a second (dedicated) controller for controlling the operation of the measurement apparatus to generate the parameter measurement data. The dedicated controller is configured to communicate parameter data to the main controller based on the measurement data, i.e. it may include and/or be derived from and/or otherwise be indicative of the measurement data. This arrangement allows the respective parameter to be monitored more frequently than might be possible if the task was performed by the main controller alone. Advantageously, the respective parameter may be monitored by the dedicated circuitry for the occurrence of an event (which may be detected by detecting changes of more than a threshold amount), and upon detection of the event the dedicated circuitry may interrupt the main controller to ensure that the event is handled promptly. It will be apparent that TPMS device described herein and in particular the BPM 340 and associated components may readily be adapted to monitor other parameters in a similar way.

The more information the ECU has about the tires parameters the better it is able to compensate for any problems associated with the tire parameters falling outside a safe threshold.

The invention is not limited to the embodiments described herein which may be modified or varied without departing from the scope of the invention.

The invention claimed is:

1. A tire monitoring device comprising:
   a sensor for monitoring a respective tire parameter to produce a sensor output signal;
   a first controller within the tire monitoring device for controlling the operation of the tire monitoring device, wherein the tire monitoring device is mountable within a vehicle tire;
   a measurement apparatus within the tire monitoring device that generates parameter measurement data from the sensor output signal, wherein the measurement apparatus includes hardware or electronic circuitry;
   a second controller within the tire monitoring device for controlling the operation of the measurement apparatus to generate the measurement data, the second controller being configured to communicate parameter data to the first controller based on the measurement data, and wherein the second controller has a lower power consumption than the first controller; and
   a transmitter for communicating with an electronic stability control system (ESC) associated with a central control unit associated with a vehicle mountable central controller, the first controller being configured to send a tire parameter transmission to the central control unit based on the parameter data received from the second controller, wherein the vehicle mountable central controller is configured to disable an Anti-lock Braking System upon determining that vibration experienced in use by the respective wheel exceeds a threshold level.

2. The device of claim 1, wherein the measurement data comprises an indication of whether the respective parameter has changed by more than a threshold amount.

3. The device of claim 2, wherein the measurement data comprises an indication of whether the respective tire parameter has changed by more than the threshold amount with respect to a reference value.

4. The device of claim 1, wherein the measurement data comprises a measured value for the respective tire parameter.

5. The device of claim 1, wherein the second controller is configured to detect an event from the measurement data, the parameter data being indicative of the event.

6. The device of claim 1, wherein the second controller is configured to communicate the parameter data to the first controller by generating an interrupt signal for first controller.

7. The device of claim 6, wherein the first controller is responsive to the interrupt signal to implement an interrupt handling routine for the event.

8. The device of claim 6, wherein the first controller is configured to reset upon receipt of the interrupt signal.

9. The device of claim 6, wherein the first controller has an interrupt control register and wherein the second controller communicates the parameter data to the first controller by setting one or more bits of the interrupt control register.

10. The device of claim 1, wherein the sensor is a pressure sensor and the respective tire parameter is tire pressure.

11. The device of claim 10, wherein the second controller is configured to detect tire burst events from the measurement data and to communicate a detected tire burst event to the first controller.

12. The device of claim 1, wherein the measurement apparatus comprises a comparator, preferably a window comparator, the comparator being responsive to changes in the sensor output signal to generate measurement data indicating if the respective parameter has changed by more than a threshold amount.

13. A tire monitoring system for a wheeled vehicle, the tire monitoring system comprising a respective wheel mountable tire monitoring device for a respective wheel of the vehicle, and a vehicle mountable central controller, the respective tire monitoring device and the respective central controller each comprising a wireless communication device to allow the respective tire monitoring device to communicate wirelessly with the central controller, wherein the respective tire monitoring device comprises:
   a sensor for monitoring a respective tire parameter to produce a sensor output signal;
   a first controller within the respective tire monitoring device for controlling the operation of the respective tire monitoring device and communicating with the central controller, wherein the tire monitoring device is mountable within a vehicle tire;
   a measurement apparatus within the respective tire monitoring device that generates parameter measurement data from the sensor output signal, wherein the measurement apparatus includes hardware or electronic circuitry;
   a second controller within the respective tire monitoring device for controlling the operation of the measurement apparatus to generate the measurement data, the second controller being configured to communicate parameter data to the first controller based on the measurement data, and wherein the second controller has a lower power consumption than the first controller; and
   a transmitter for communicating with an electronic stability control system (ESC) associated with vehicle mountable central controller, the first controller being configured to send a tire parameter transmission to the vehicle mountable central controller based on the parameter data received from the second controller, wherein the central controller is configured to disable an Anti-lock Braking System upon determining that vibration experienced in use by the respective wheel exceeds a threshold level.

14. A tire monitoring system for a wheeled vehicle, the tire monitoring system comprising a respective wheel mountable tire monitoring device for a respective wheel of the vehicle, and a vehicle mountable central controller, the respective tire monitoring device and the respective central controller unit each comprising a wireless communication device to allow the respective tire monitoring device to communicate with the central controller, wherein the respective tire monitoring device comprises:
- a vibration-sensitive sensor for monitoring a respective tire parameter to produce a sensor output signal that includes a vibration component indicative of vibration experienced in use by the respective wheel;
- a measurement apparatus comprising a first controller within the respective tire monitoring device that generates measurement data from the sensor output signal, wherein the measurement apparatus includes hardware or electronic circuitry, the measurement data comprising vibration data corresponding to the vibration component, wherein the tire monitoring device is mountable within a vehicle tire; and
- a second controller coupled with the first controller within the respective tire monitoring device and configured to send a tire parameter transmission to the vehicle mountable central controller, the tire parameter transmission based at least in part on the vibration data, and wherein the second controller has a lower power consumption than the first controller, wherein the vehicle mountable central controller determines whether the tire parameter transmission is low enough for action to be taken by an electronic stability control system (ESC),
- and wherein the central controller includes, or is co-operable with, an Anti-lock Braking System (ABS), and is responsive to receipt of the tire parameter transmission to adjust or disable the Anti-lock Braking System based at least in part on the vibration data, wherein the central controller is configured to disable the Anti-lock Braking System upon determining that vibration experienced in use by the respective wheel exceeds a threshold level.

15. The tire monitoring system of claim 14, wherein the vibration-sensitive sensor comprises a motion sensor.

* * * * *